United States Patent
Simone et al.

(10) Patent No.: US 9,452,488 B2
(45) Date of Patent: Sep. 27, 2016

(54) METHOD OF FORMING GOLF CLUB HEAD ASSEMBLY

(71) Applicant: Karsten Manufacturing Corporation, Phoenix, AZ (US)

(72) Inventors: Matthew W. Simone, Phoenix, AZ (US); Evan R. Greer, Anthem, AZ (US); Ryan M. Stokke, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 250 days.

(21) Appl. No.: 14/228,503

(22) Filed: Mar. 28, 2014

(65) Prior Publication Data
US 2015/0231728 A1    Aug. 20, 2015

Related U.S. Application Data

(60) Provisional application No. 61/941,117, filed on Feb. 18, 2014.

(51) Int. Cl.
*B23K 10/02*    (2006.01)
*A63B 53/04*    (2015.01)

(52) U.S. Cl.
CPC ............. *B23K 10/02* (2013.01); *A63B 53/04* (2013.01); *A63B 53/0466* (2013.01); *A63B 2053/042* (2013.01); *A63B 2209/00* (2013.01)

(58) Field of Classification Search
CPC .. B23K 10/02; A63B 53/04; A63B 2209/00; A63B 53/0466; A63B 2053/042
USPC ........................................ 219/121.59, 121.45
See application file for complete search history.

(56) References Cited

U.S. PATENT DOCUMENTS

| | | | |
|---|---|---|---|
| 4,923,532 A | 5/1990 | Zedalis et al. | |
| 6,333,484 B1 | 12/2001 | Foster et al. | |
| 6,955,612 B2 * | 10/2005 | Lu ................. | A63B 53/0466 219/121.59 |
| 7,357,731 B2 | 4/2008 | Johnson et al. | |
| 7,553,384 B2 | 6/2009 | Groh | |
| 9,155,942 B2 * | 10/2015 | Ueda ............... | A63B 53/02 |
| 2002/0016216 A1 | 2/2002 | Kobayashi et al. | |
| 2003/0008726 A1 | 1/2003 | Sano | |
| 2003/0064825 A1 | 4/2003 | Sano | |
| 2004/0079453 A1 | 4/2004 | Groh et al. | |
| 2004/0082405 A1 | 4/2004 | Sano | |
| 2004/0099714 A1 | 5/2004 | Strusinski et al. | |
| 2004/0147343 A1 | 7/2004 | Billings et al. | |
| 2006/0062685 A1 | 3/2006 | Takahashi | |
| 2007/0056938 A1 * | 3/2007 | Chen ................. | B23K 10/02 219/121.46 |
| 2008/0194356 A1 | 8/2008 | Lo | |
| 2009/0181794 A1 | 7/2009 | Tsai et al. | |
| 2010/0154196 A1 | 6/2010 | Hirano | |
| 2010/0178996 A1 | 7/2010 | Chao | |

(Continued)

OTHER PUBLICATIONS

PCT International Search Report dated May 20, 2015 from corresponding PCT Application No. PCT/US2015/016207 filed Feb. 17, 2015.

*Primary Examiner* — Mark Paschall

(57) ABSTRACT

A method of forming a golf club head assembly includes aligning a faceplate with a recess of a club head; welding the faceplate to the club head; then, after welding the faceplate, heating the club head and faceplate to at least a solvus temperature of the faceplate for a predetermined amount of time; and then, after heating the club head and faceplate, allowing the club head and faceplate to air cool.

10 Claims, 8 Drawing Sheets

(56) References Cited

U.S. PATENT DOCUMENTS

| | | |
|---|---|---|
| 2010/0205805 A1 | 8/2010 | Mega et al. |
| 2010/0317460 A1* | 12/2010 | Hirano ............... A63B 53/0466 473/342 |
| 2012/0090738 A1 | 4/2012 | Hales et al. |

* cited by examiner

METHOD OF FORMING GOLF CLUB HEAD ASSEMBLY

CROSS-REFERENCE TO RELATED APPLICATIONS

This is a non-provisional of U.S. Patent Application No. 61/941,117, filed on Feb. 18, 2014, the entire contents of which are fully incorporated herein by reference.

BACKGROUND

The present invention relates to golf clubs and particularly to a method of forming a golf club head assembly.

Conventional golf club head assemblies include a faceplate welded to a club head. The faceplate has a slightly rounded shape in order to provide a straighter and/or longer flight path for a golf ball, even when the ball is struck off-center with respect to the faceplate. The faceplate has a bulge dimension, or curvature from a toe end to a heel end, and a roll dimension, or curvature from the crown edge to the sole edge.

Aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

DETAILED DESCRIPTION

Figure 1:
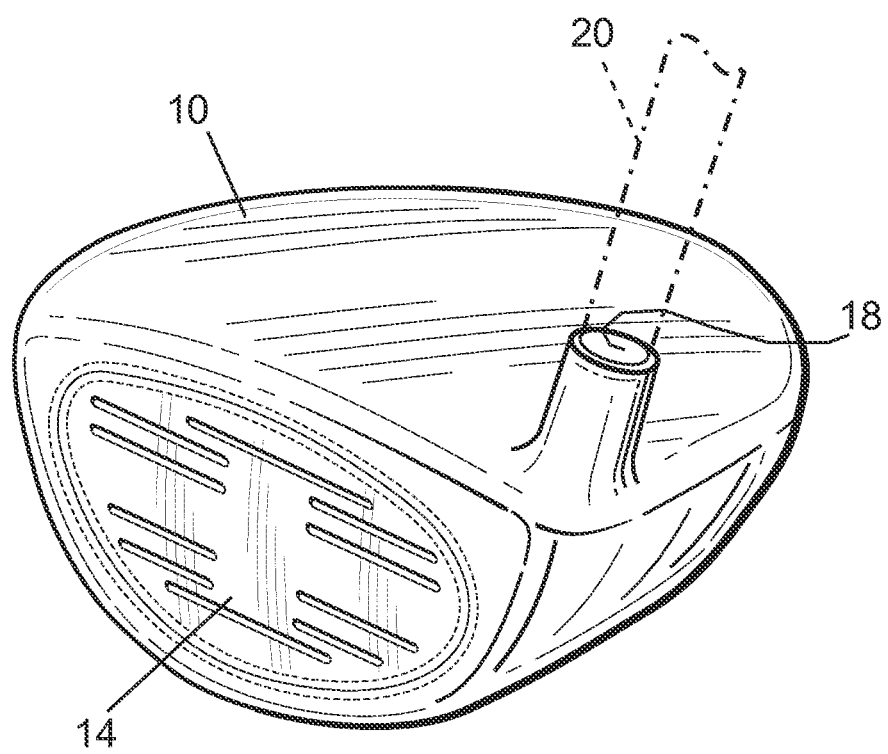
FIG. 1 is a perspective view of a club head and a face plate.
Figure 2:
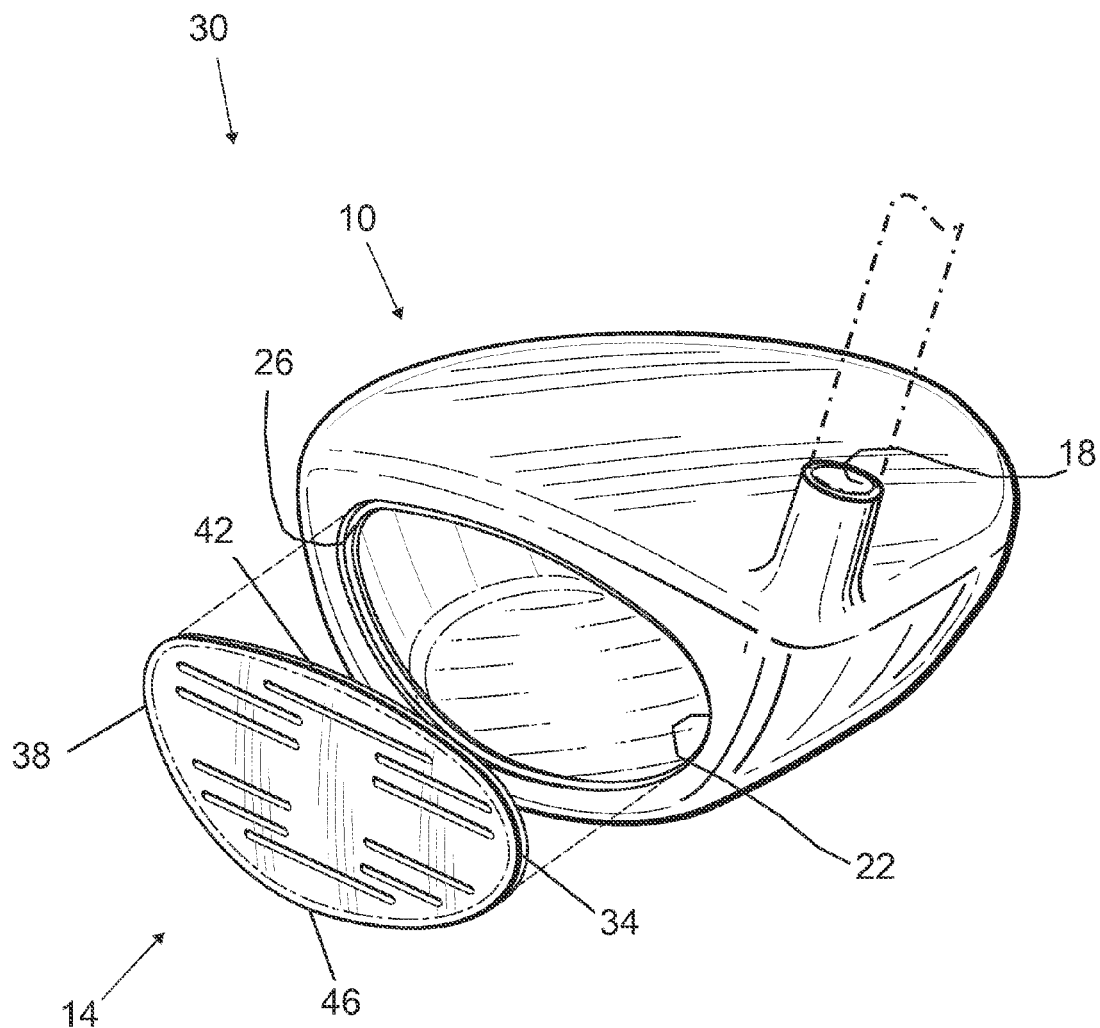
FIG. 2 is a perspective view of the club head with the face plate removed.

FIG. 1 shows a golf club head 10 and a faceplate 14. In one embodiment, the club head 10 is formed from a cast material and the faceplate 14 is formed from a rolled material. Further, in the illustrated embodiment, the club head 10 is for a metal wood driver; in other embodiments, the club head 10 is for an iron club. The club head 10 includes a neck portion having a slot 18 for coupling the club head 10 to a shaft 20. As shown in FIG. 2, the club head 10 further includes a recess or opening 22 for receiving the faceplate 14. In the illustrated embodiment, the opening 22 includes a lip 26 extending around the perimeter of the opening 22. The faceplate 14 is aligned with the opening and abuts the lip 26. The faceplate 14 is secured to the club head 10 by welding, forming a club head assembly 30. In one embodiment, the welding is a pulse plasma welding process.

Figure 3:
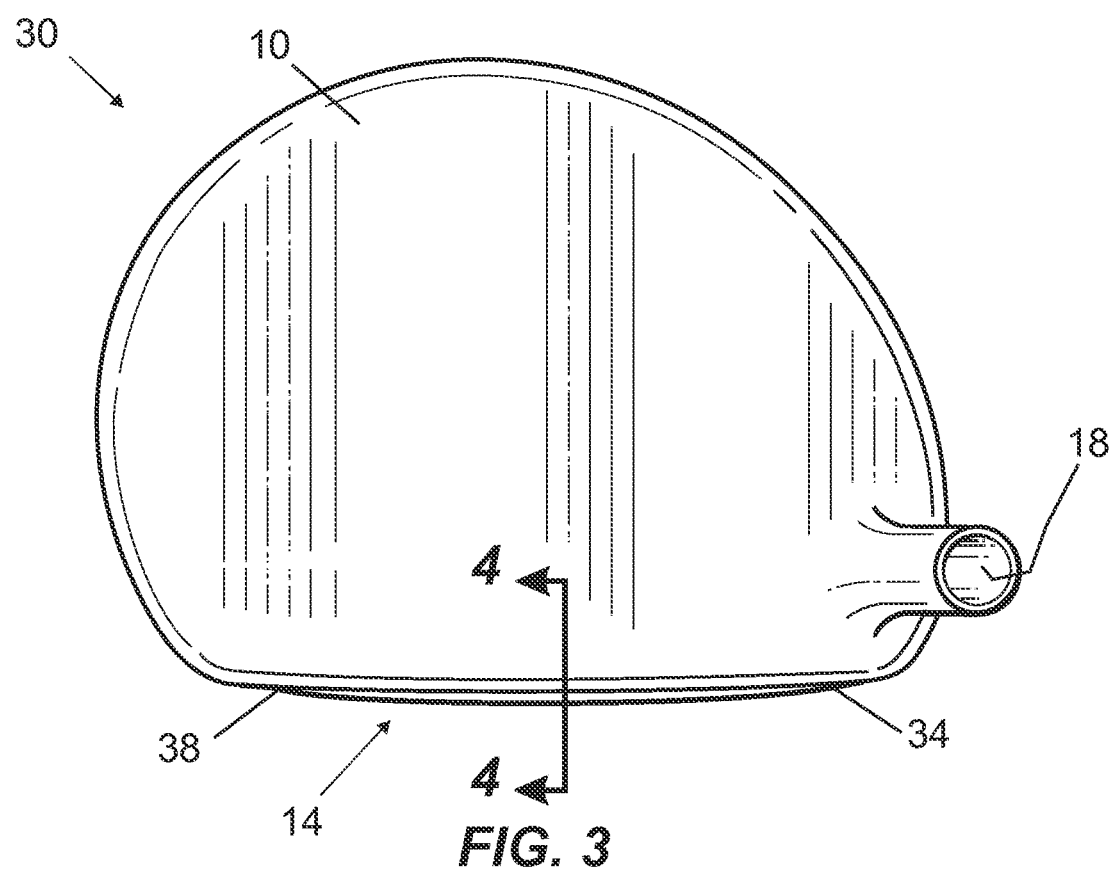
FIG. 3 is a top view of a club head assembly.
Figure 4:
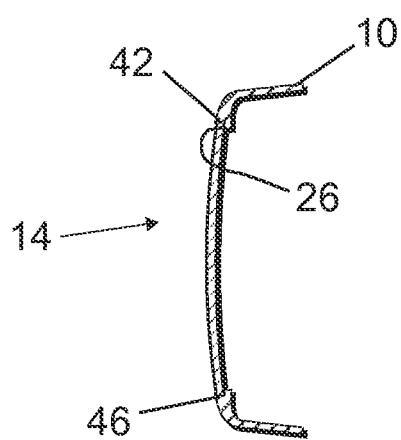
FIG. 4 is a side section view of the club head assembly of FIG. 3 along section 4-4.
Figure 5:
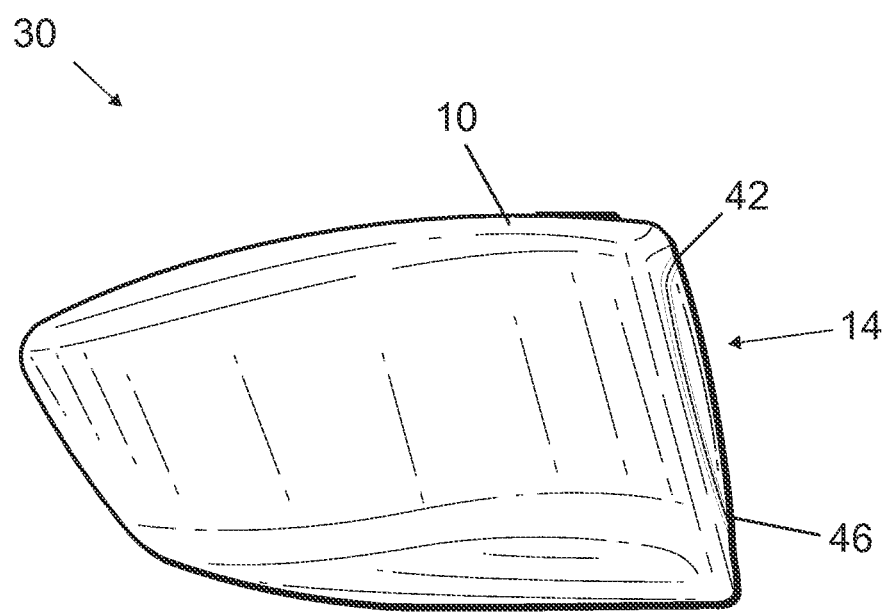
FIG. 5 is a side view of the club head assembly of FIG. 3.

The faceplate 14 includes a heel end 34 and a toe end 38 opposite the heel end 34. The heel end 34 is positioned proximate the neck portion where the shaft 20 (FIG. 1) is coupled to the club head assembly 30. The faceplate 14 further includes a crown edge 42 and a sole edge 46 opposite the crown edge 42. The crown edge 42 is positioned adjacent an upper edge of the club head 10, while the sole edge 46 is positioned adjacent the lower edge of the club head 10. As shown in FIG. 3, the faceplate 14 has a bulge or curvature in a direction extending between the heel end 34 and the toe end 38. As shown in FIGS. 4 and 5, the faceplate 14 also has a roll or curvature in a direction extending between the crown edge 42 and the sole edge 46.

The faceplate 14 is formed from a titanium alloy. In one embodiment, the faceplate 14 is an $\alpha$-$\beta$ titanium ($\alpha$-$\beta$ Ti) alloy. The $\alpha$-$\beta$ Ti alloy may contain neutral alloying elements such as tin and a stabilizers such as aluminum and oxygen. The $\alpha$-$\beta$ Ti alloy may contain $\beta$-stabilizers such as molybdenum, silicon and vanadium. The total percent of $\alpha$-stabilizer aluminum in $\alpha$-$\beta$ Ti alloy may be between 2% to 10%, 3% to 9%, 4% to 8%, or 5% to 7%. The total percent of $\alpha$-stabilizer oxygen in $\alpha$-$\beta$ Ti alloy may be between 0.05% to 0.35%, or 0.10% to 0.20%. The total percent of $\beta$-stabilizer molybdenum in $\alpha$-$\beta$ Ti alloy may be between 0.2% to 1.0%, or 0.6% to 0.8%, or trace amounts. The total percent of $\alpha$-stabilizer vanadium in $\alpha$-$\beta$ Ti alloy may be between 1.5% to 7%, or 3.5% to 4.5%. The total percent of $\beta$-stabilizer silicon in $\alpha$-$\beta$ Ti alloy may be between 0.01 to 0.10%, or 0.03% to 0.07%. The $\alpha$-$\beta$ Ti alloy may be Ti-6Al-4V (or Ti 6-4), Ti-9S, Ti-662, Ti-6246, or IMI 550. The combination of $\alpha$, $\beta$ stabilizers allows the $\alpha$-$\beta$ Ti alloys to be heat treated.

After welding the faceplate 14 to the club head 10, the club head assembly 30 is heat treated at a temperature at or just above the $\alpha$-$\beta$ Ti solvus temperature. After the heat treatment, the club head assembly 30 is allowed to air cool to slowly reduce the club head assembly's temperature.

As understood by a person of ordinary skill, the solvus temperature for an alloy is the temperature barrier at which smaller constituent molecules dissolve within the general matrix of the material and become more mobile. The solvus temperatures of most $\alpha$-$\beta$ Ti alloys are verified and readily available in academic literature or information published by material suppliers. If published data is unavailable, the temperature values can be estimated and experimentally confirmed, since it is dependent on the material's chemistry. The solvus temperature for $\alpha$-$\beta$ Ti can be above 400° C. and below 600° C. The $\alpha$-$\beta$ Ti can be Ti 6-4 containing 6% aluminum (Al), and 4% vanadium (V), with the remaining alloy composition being titanium and possibly some trace elements. In some embodiments, Ti 6-4 contains between 5.5%-6.75% Al, between 3.5%-4.5% V, a maximum of 0.08% carbon (C), a maximum of 0.03% silicon (Si), a maximum of 0.3% iron (Fe), a maximum of 0.2% oxygen (O), a maximum of 0.015% tin (Sn), and trace amounts of molybedenum (Mo), with the remaining alloy composition being titanium. Ti 6-4 is a grade 5 titanium. The solvus temperature for Ti 6-4 is between 540° C. and 560° C.

In other embodiments, the material may be another α-β Ti alloy, such as Ti-9S which contains 8% Al, 1% V, and 0.2% Si, with the remaining alloy composition being titanium and possibly some trace elements. In some embodiments, Ti-9S contains 6.5%-8.5% Al, between 1%-2% V, a maximum of 0.08% C, a maximum of 0.2% Si, a maximum of 0.3% Fe, a maximum of 0.2% O, trace amounts of Mo, and trace amounts of Sn, with the remaining alloy composition being titanium. The solvus temperature for Ti-9S is between 560° C. and 590° C.

In other embodiments, the material may be another α-β Ti alloy such as Ti-662, Ti-6246, or IMI 550. Titanium 662 contains 6% Al, 6% V, and 2% Sn, with the remaining alloy composition being titanium and possibly some trace elements. The solvus temperature for Ti 662 is between 540° C. and 560° C. Titanium 6246 contains 6% Al, 2% Sn, 4% zirconium (Zr), and 6% Mo, with the remaining alloy composition being titanium and possibly some trace elements. The solvus temperature for Ti 6246 is between 570° C. and 590° C. IMI 550 contains 6% Al, 2% Sn, 4% Mo, and 0.5% Si, with the remaining alloy composition being titanium and possibly some trace elements. The solvus temperature for IMI 500 is between 490° C. and 510° C.

Figure 6:
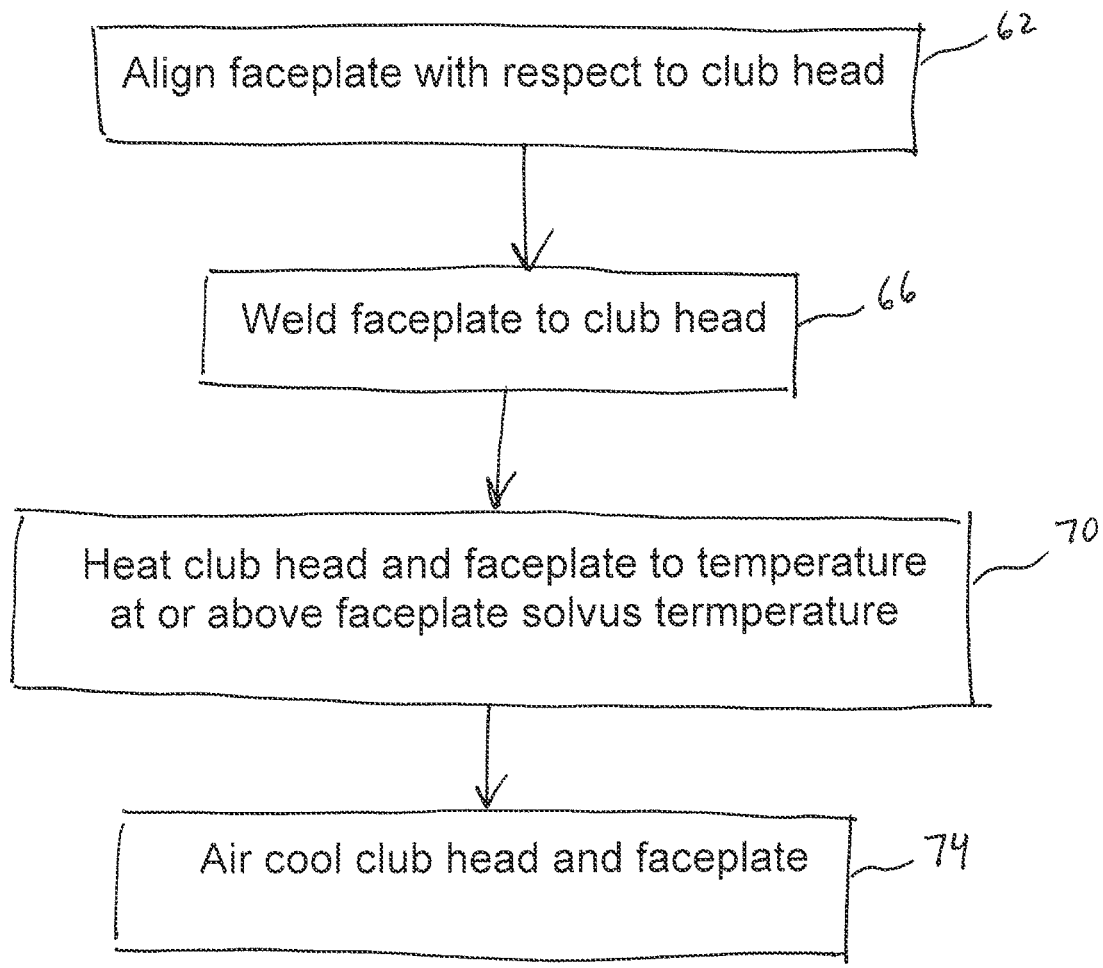
FIG. 6 is a schematic view of a process for forming a golf club head assembly.

FIG. 6 shows the process for forming for the club head assembly 30. In the first step 62, the faceplate 14 is aligned with respect to the club head 10. The second step 66 involves welding the faceplate 14 to the club head 10. In the third step 70, the club head 10 and the faceplate 14 are heated to a temperature at or above the solvus temperature of the faceplate 14 material. Finally, in the fourth step 74 the club head 10 and the faceplate 14 are air cooled.

In one embodiment, the club head assembly 30 is heat treated at a temperature at or above the solvus temperature of the α-β Ti alloy for between 1 hour and 6 hours in the third step 70. In one embodiment, the club head assembly 30 is heat treated at a temperature at or above the solvus temperature of the α-β Ti alloy for between 1 hour and 2 hours in the third step 70. In one embodiment, the club head assembly 30 is heat treated at a temperature at or above the solvus temperature of the α-β Ti alloy for between 1 hour and 4 hours in the third step 70. In one embodiment, the club head assembly 30 is heat treated at a temperature at or above the solvus temperature of the α-β Ti alloy for between 4 hours and 6 hours in the third step 70. In one embodiment, the club head assembly 30 is heat treated at a temperature at or above the solvus temperature of the α-β Ti alloy for between 1.5 hours and 5.5 hours in the third step 70. In one embodiment, the club head assembly 30 is heat treated at a temperature at or above the solvus temperature of the α-β Ti alloy for between 2 hours and 5 hours in the third step 70. In one embodiment, the club head assembly 30 is heat treated at a temperature at or above the solvus temperature of the α-β Ti alloy for between 2.5 hours and 4.5 hours in the third step 70. In one embodiment, the club head assembly 30 is heat treated at a temperature at or above the solvus temperature of the α-β Ti alloy for between 3 hours and 4 hours in the third step 70.

In one embodiment, the club head assembly 30 is heat treated at a temperature at or above the solvus temperature of the α-β Ti alloy for at least 1 hour in the third step 70. In one embodiment, the club head assembly 30 is heat treated at a temperature at or above the solvus temperature of the α-β Ti alloy for at least 1.5 hours in the third step 70. In one embodiment, the club head assembly 30 is heat treated at a temperature at or above the solvus temperature of the α-β Ti alloy for at least 2 hours in the third step 70. In one embodiment, the club head assembly 30 is heat treated at a temperature at or above the solvus temperature of the α-β Ti alloy for at least 2.5 hours in the third step 70. In one embodiment, the club head assembly 30 is heat treated at a temperature at or above the solvus temperature of the α-β Ti alloy for at least 3 hours in the third step 70. In one embodiment, the club head assembly 30 is heat treated at a temperature at or above the solvus temperature of the α-β Ti alloy for at least 3.5 hours in the third step 70. In one embodiment, the club head assembly 30 is heat treated at a temperature at or above the solvus temperature of the α-β Ti alloy for at least 4 hours in the third step 70. In one embodiment, the club head assembly 30 is heat treated at a temperature at or above the solvus temperature of the α-β Ti alloy for at least 4.5 hours in the third step 70. In one embodiment, the club head assembly 30 is heat treated at a temperature at or above the solvus temperature of the α-β Ti alloy for at least 5 hours in the third step 70. In one embodiment, the club head assembly 30 is heat treated at a temperature at or above the solvus temperature of the α-β Ti alloy for at least 5.5 hours in the third step 70. In one embodiment, the club head assembly 30 is heat treated at a temperature at or above the solvus temperature of the α-β Ti alloy for at least 6 hours in the third step 70.

In one embodiment, the club head assembly 30 is heat treated between 400° C. and 630° C. in the third step 70. In one embodiment, the club head assembly 30 is heat treated between 425° C. and 550° C. In one embodiment, the club head assembly 30 is heat treated between 450° C. and 525° C. in the third step 70. In one embodiment, the club head assembly 30 is heat treated between 550° C. and 625° C. in the third step 70.

In one embodiment, the club head assembly 30 is heat treated at a temperature of at least 400° C. in the third step 70. In one embodiment, the club head assembly 30 is heat treated at a temperature of at least 420° C. in the third step 70. In one embodiment, the club head assembly 30 is heat treated at a temperature of at least 440° C. in the third step 70. In one embodiment, the club head assembly 30 is heat treated at a temperature of at least 460° C. in the third step 70. In one embodiment, the club head assembly 30 is heat treated at a temperature of at least 475° C. in the third step 70. In one embodiment, the club head assembly 30 is heat treated at a temperature of at least 480° C. in the third step 70. In one embodiment, the club head assembly 30 is heat treated at a temperature of at least 500° C. in the third step 70. In one embodiment, the club head assembly 30 is heat treated at a temperature of at least 520° C. in the third step 70. In one embodiment, the club head assembly 30 is heat treated at a temperature of at least 540° C. in the third step 70. In one embodiment, the club head assembly 30 is heat treated at a temperature of at least 560° C. in the third step 70. In one embodiment, the club head assembly 30 is heat treated at a temperature of at least 575° C. in the third step 70. In one embodiment, the club head assembly 30 is heat treated at a temperature of at least 580° C. In one embodiment, the club head assembly 30 is heat treated at a temperature of at least 600° C. in the third step 70. In one embodiment, the club head assembly 30 is heat treated at a temperature of at least 620° C. in the third step 70. In one embodiment, the club head assembly 30 is heat treated at a temperature of at least 625° C. in the third step 70. In one embodiment, the club head assembly 30 is heat treated at a temperature of at least 630° C. in the third step 70.

In one embodiment, the club head assembly 30 is heat treated between 475° C. and 500° C. for between 4 hours and 6 hours in the third step 70. In another embodiment, the club head is heat treated between 575° C. and 625° C. for between 1 hour and 2 hours in the third step 70. In another embodiment, the club head is heat treated at about 550° C. for between 1 hour and 4 hours. In other embodiments, the face plate 14 may be formed from a different alloy in the third step 70. In other embodiments, the heat treatment process may be implemented at other temperatures for a different amount of time. In addition, the heat treatment may be applied to a variety of materials and a variety of weld-types.

Unlike conventional club head metal aging processes that occurred at low temperature, heat-treating the club head assembly 30 above the solvus temperature after welding the faceplate 14 relieves stresses in the faceplate 14 and between the weld and the metal matrix of the club head 10. The post-weld stress relief disperses stresses associated with the weld-metal heat affected zone (HAZ), or the area around the weld in which the material properties have been altered due to the welding process. Because of the stark contrast in mechanical properties between the HAZ and the rest of the metal matrix, the HAZ is much more likely to experience a crack and fail. Previous post-weld treatments were performed below the solvus temperature for a short duration of time. These processes simply aged the metals but did not address the increased stresses transferred to the weld area. Furthermore, the faceplate was not sufficiently strong and would flatten or lose its curvature relatively quickly. In contrast, the heat treatment above the solvus temperature disperses stresses in the weld metal HAZ. The heat-treatment improves the durability of the HAZ by relieving the stresses. In addition, heat-treating the club head assembly 30 above the solvus temperature reduces the possibility of generating titanium-aluminum ($Ti_3Al$) crystals along the weld.

The heat treatment also improves the strength of the faceplate 14. The improved strength permits the faceplate 14 to be made thinner without sacrificing durability, thereby reducing club head weight. The reduced weight of the club head assembly 30 shifts the center of gravity of the club, and allows additional weight to be added to another component of the club to further adjust the center of gravity. Increasing the strength of the faceplate 14 also increases the durability of the faceplate 14, which permits the faceplate 14 to endure a significantly higher number of hits against a golf ball and maintain the faceplate's slightly bowed or rounded shape over the life of the club while sustaining hundreds or thousands of golf ball strikes. Therefore, the club is more forgiving when a ball is struck off-center because the rounded shape of the faceplate 14 provides a "gear effect" between the ball and faceplate 14.

Figure 7:
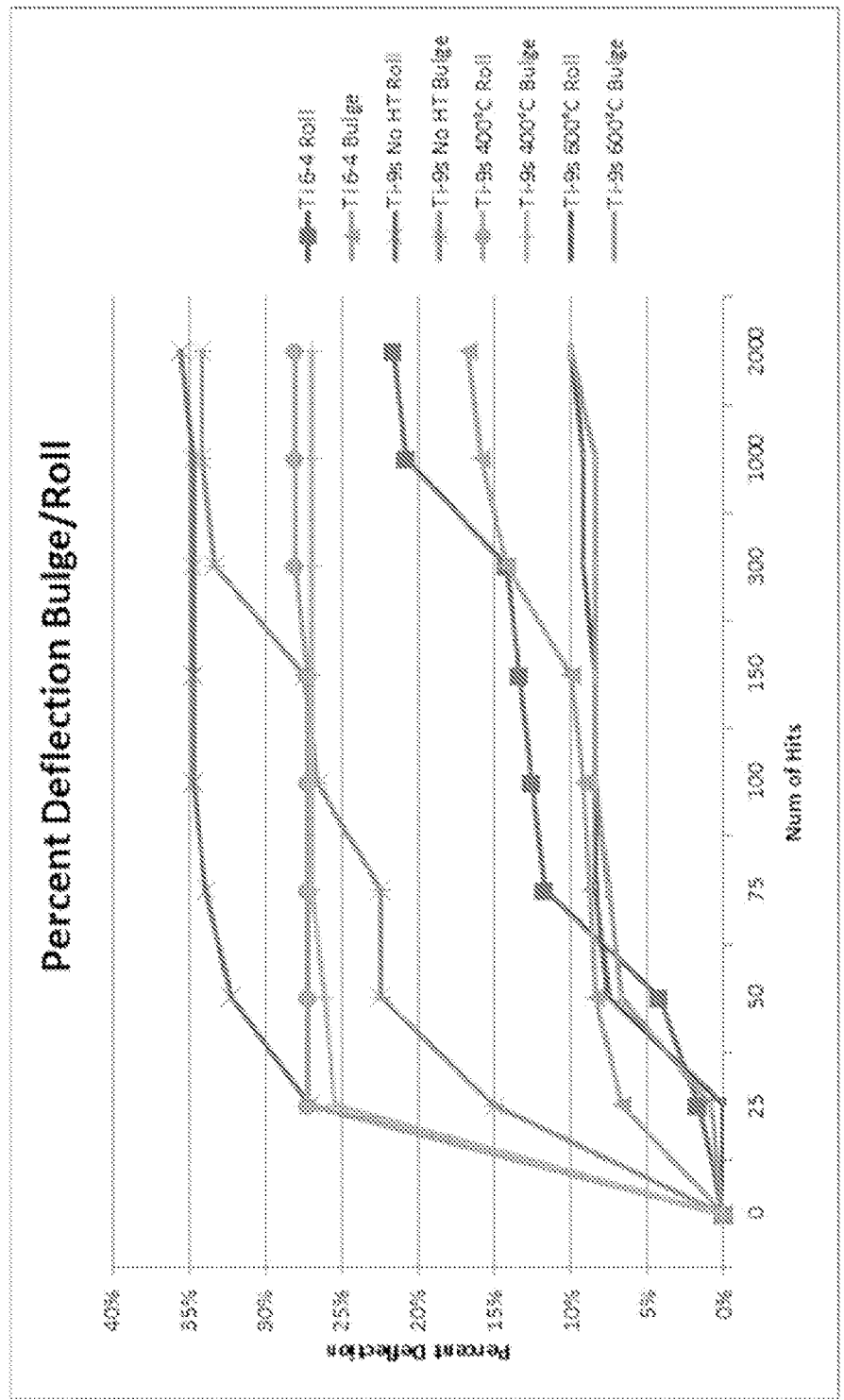
FIG. 7 is a chart showing experimental bulge and roll measurements for faceplates that are subjected to various heat-treatment processes.

As shown in FIG. 7, an experiment was performed to compare the effect of various heat treatment temperatures on the faceplate 14 over the course of 2,000 hits or ball strikes. The faceplates 14 were formed from Ti-9S alloy. One club head assembly was heated to 400° C., which is below the solvus temperature of the Ti-9S alloy. A second club head assembly was heated to 600° C., which is above the solvus temperature of the Ti-9S alloy. The measurement data provided in FIG. 7 represent the percent change in the radius of curvature of the bulge and the roll dimensions compared to the original radius of curvature. As the faceplate becomes more flat, the radius of curvature increases. The club head assembly treated at 400° C. flattened significantly in both its roll and bulge dimensions within 25 hits on a golf ball. In contrast, the club head assembly treated at 600° C. maintained its curvature significantly better than the first club head assembly after 2,000 hits.

For heat treatments below the solvus temperature (for example, at 400° C.), $Ti_3Al$ particles become more mobile and can precipitate into the α-matrix. Some of the $Ti_3Al$ particles gather at grain boundaries and age harden the material. In contrast, for heat treatments above the solvus temperature (for example, at 600° C.), $Ti_3Al$ particles instead dissolve within the α-matrix and relieve stresses within the material. The stress relief processes enables the club head assembly 30 to withstand tensile and compressive forces during impact against a golf ball.

In one embodiment, the faceplate 14 that is formed from Ti-9S and heat treated above the solvus temperature of Ti-9S remains within 2% of its original bulge and roll curvature after about 25 strikes. In one embodiment, the faceplate 14 that is formed from Ti 6-4 and heat treated above the solvus temperature of Ti 6-4 remains within 3% of its original roll curvature and within 8% of its original bulge curvature after about 25 strikes.

In one embodiment, the faceplate 14 that is formed from Ti-9S and heat treated above the solvus temperature of Ti-9S remains within 8% of its original bulge and roll curvature after about 50 strikes. In one embodiment, the faceplate 14 that is formed from Ti 6-4 and heat treated above the solvus temperature of Ti 6-4 remains within 5% of its original roll curvature and within 10% of its original bulge curvature after about 50 strikes.

In one embodiment, the faceplate 14 that is formed from Ti-9S and heat treated above the solvus temperature of Ti-9S remains within 10% of its original bulge and roll curvature after about 75 strikes. In one embodiment, the faceplate 14 that is formed from Ti 6-4 and heat treated above the solvus temperature of Ti 6-4 remains within 13% of its original roll curvature and within 10% of its original bulge curvature after about 75 strikes.

In one embodiment, the faceplate 14 that is formed from Ti-9S and heat treated above the solvus temperature of Ti-9S remains within 10% of its original bulge and roll curvature after about 100 strikes. In one embodiment, the faceplate 14 that is formed from Ti 6-4 and heat treated above the solvus temperature of Ti 6-4 remains within 14% of its original roll curvature and within 10% of its original bulge curvature after about 100 strikes.

In one embodiment, the faceplate 14 that is formed from Ti-9S and heat treated above the solvus temperature of Ti-9S remains within 10% of its original bulge and roll curvature after about 150 strikes. In one embodiment, the faceplate 14 that is formed from Ti 6-4 and heat treated above the solvus temperature of Ti 6-4 remains within 15% of its original roll curvature and within 11% of its original bulge curvature after about 150 strikes.

In one embodiment, the faceplate 14 that is formed from Ti-9S and heat treated above the solvus temperature of Ti-9S remains within 10% of its original bulge and roll curvature after about 300 strikes. In one embodiment, the faceplate 14 that is formed from Ti 6-4 and heat treated above the solvus temperature of Ti 6-4 remains within 15% of its original roll and bulge curvature after about 300 strikes.

In one embodiment, the faceplate 14 that is formed from Ti-9S and heat treated above the solvus temperature of Ti-9S remains within 10% of its original bulge and roll curvature after about 1,000 strikes. In one embodiment, the faceplate 14 that is formed from Ti 6-4 and heat treated above the solvus temperature of Ti 6-4 remains within 23% of its original roll curvature and within 17% of its original bulge curvature after about 1,000 strikes.

In one embodiment, the faceplate 14 that is formed from Ti-9S and heat treated above the solvus temperature of Ti-9S remains within 10% of its original bulge and roll curvature after about 2,000 strikes. In one embodiment, the faceplate 14 that is formed from Ti 6-4 and heat treated above the solvus temperature of Ti 6-4 remains within 24% of its original roll curvature and within 18% of its original bulge curvature after about 2,000 strikes.

Furthermore, an experiment was performed to compare the effect of various heat treatment temperatures on the faceplate 14 over the course of 2,000 hits or ball strikes. The faceplate 14 was formed from α-β Ti alloy. One club head assembly was heated to 400° C., which is below the solvus temperature of the α-β Ti alloy. A second club head assembly was heated to 600° C., which is above the solvus temperature of the α-β Ti alloy. The club head assembly treated at 400° C. flattened significantly in both its roll and bulge dimensions within 25 hits on a golf ball. In contrast, the club head assembly treated at 600° C. did not begin to flatten until 225 strikes on a golf ball and maintained its curvature significantly better than the first club head assembly after 2,000 hits.

In one embodiment, the club head assembly treated at 600° C. maintained its original bulge and roll curvature after 25 hits. In one embodiment, the club head assembly treated at 600° C. maintained its original bulge and roll curvature after 50 hits. In one embodiment, the club head assembly treated at 600° C. maintained its original bulge and roll curvature after 75 hits. In one embodiment, the club head assembly treated at 600° C. maintained its original bulge and roll curvature after 100 hits. In one embodiment, the club head assembly treated at 600° C. maintained its original bulge and roll curvature after 125 hits. In one embodiment, the club head assembly treated at 600° C. maintained its original bulge and roll curvature after 150 hits. In one embodiment, the club head assembly treated at 600° C. maintained its original bulge and roll curvature after 175 hits. In one embodiment, the club head assembly treated at 600° C. maintained its original bulge and roll curvature after 200 hits. In one embodiment, the club head assembly treated at 600° C. maintained its original bulge and roll curvature after 225 hits.

In one embodiment, the club head assembly treated at 600° C. substantially maintained its bulge and roll curvature after 250 hits. In one embodiment, the club head assembly treated at 600° C. substantially maintained its bulge and roll curvature after 275 hits. In one embodiment, the club head assembly treated at 600° C. substantially maintained its bulge and roll curvature after 300 hits. In one embodiment, the club head assembly treated at 600° C. substantially maintained its bulge and roll curvature after 500 hits. In one embodiment, the club head assembly treated at 600° C. substantially maintained its bulge and roll curvature after 1,000 hits. In one embodiment, the club head assembly treated at 600° C. substantially maintained its bulge and roll curvature after 1500 hits. In one embodiment, the club head assembly treated at 600° C. substantially maintained its bulge and roll curvature after 2,000 hits.

In one embodiment, the club head assembly treated at 600° C. maintained its original bulge curvature and its roll curvature radius increased from 11 inches to 13 inches after 250 hits. In one embodiment, the club head assembly treated at 600° C. maintained its original bulge curvature and maintained a roll curvature radius of 13 inches after 275 hits. In one embodiment, the club head assembly treated at 600° C. increased its bulge curvature radius from 12 inches to 13 inches and maintained a roll curvature radius of 13 inches after 300 hits. In one embodiment, the club head assembly treated at 600° C. maintained its bulge curvature radius of 13 inches and maintained a roll curvature radius of 13 inches after 500 hits. In one embodiment, the club head assembly treated at 600° C. maintained its bulge curvature radius of 13 inches and increased its roll curvature radius from 13 inches to 14 inches after 1,000 hits. In one embodiment, the club head assembly treated at 600° C. maintained its bulge curvature radius of 13 inches and maintained a roll curvature radius of 14 inches after 1,500 hits. In one embodiment, the club head assembly treated at 600° C. maintained its bulge curvature radius of 13 inches and maintained a roll curvature radius of 14 inches after 2,000 hits.

Figure 8:
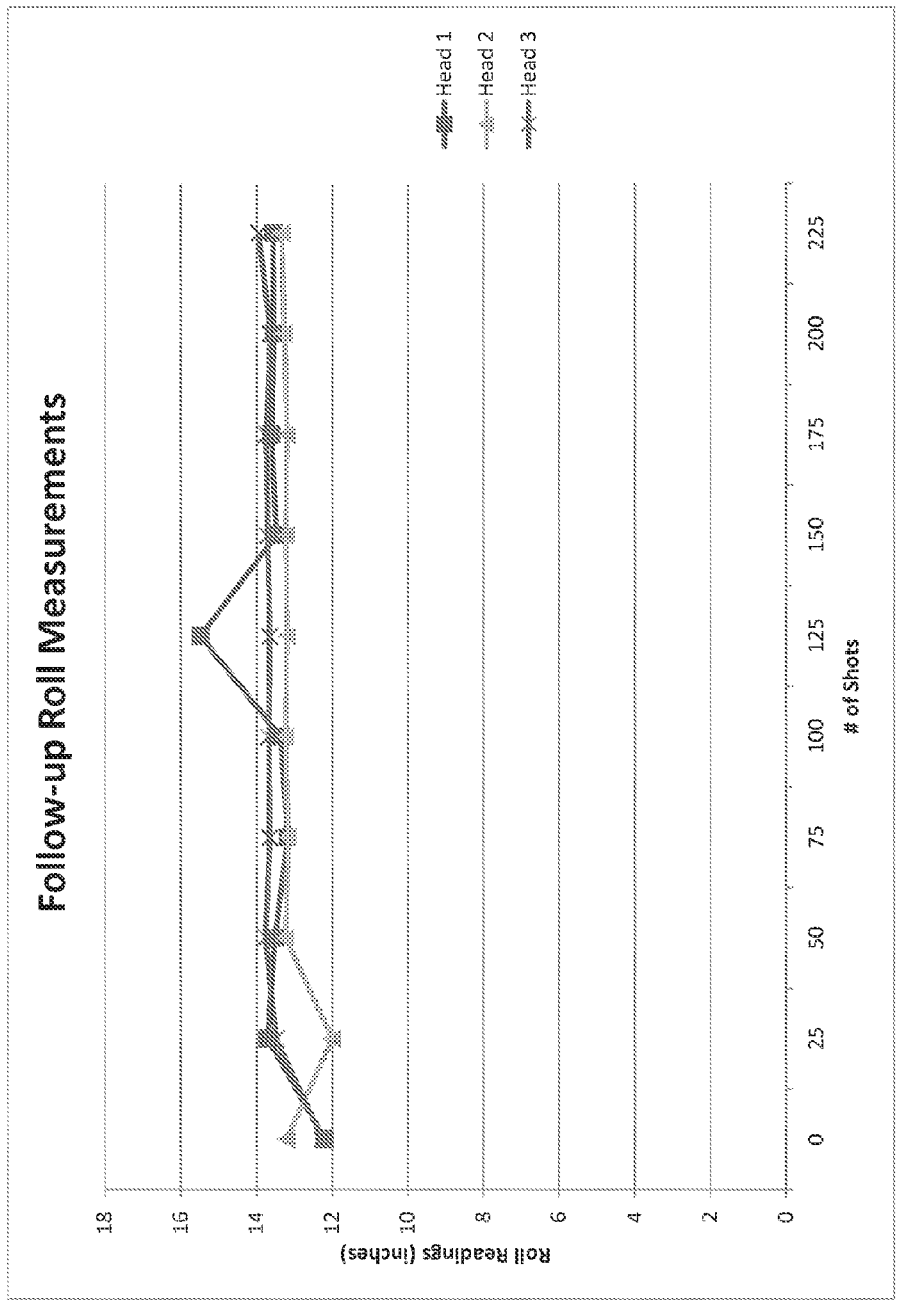
FIG. 8 is a chart showing experimental roll measurements for faceplates having various geometries.

Also, as shown in FIG. 8, a follow-up experiment was performed to compare the impact of a 600° C. heat treatment on three different faceplate geometries. The roll measurements for all three faceplate geometries were consistent, confirming that the stress-relief heat treatment increases the faceplate's ability to maintain its curvature.

Figure 9:
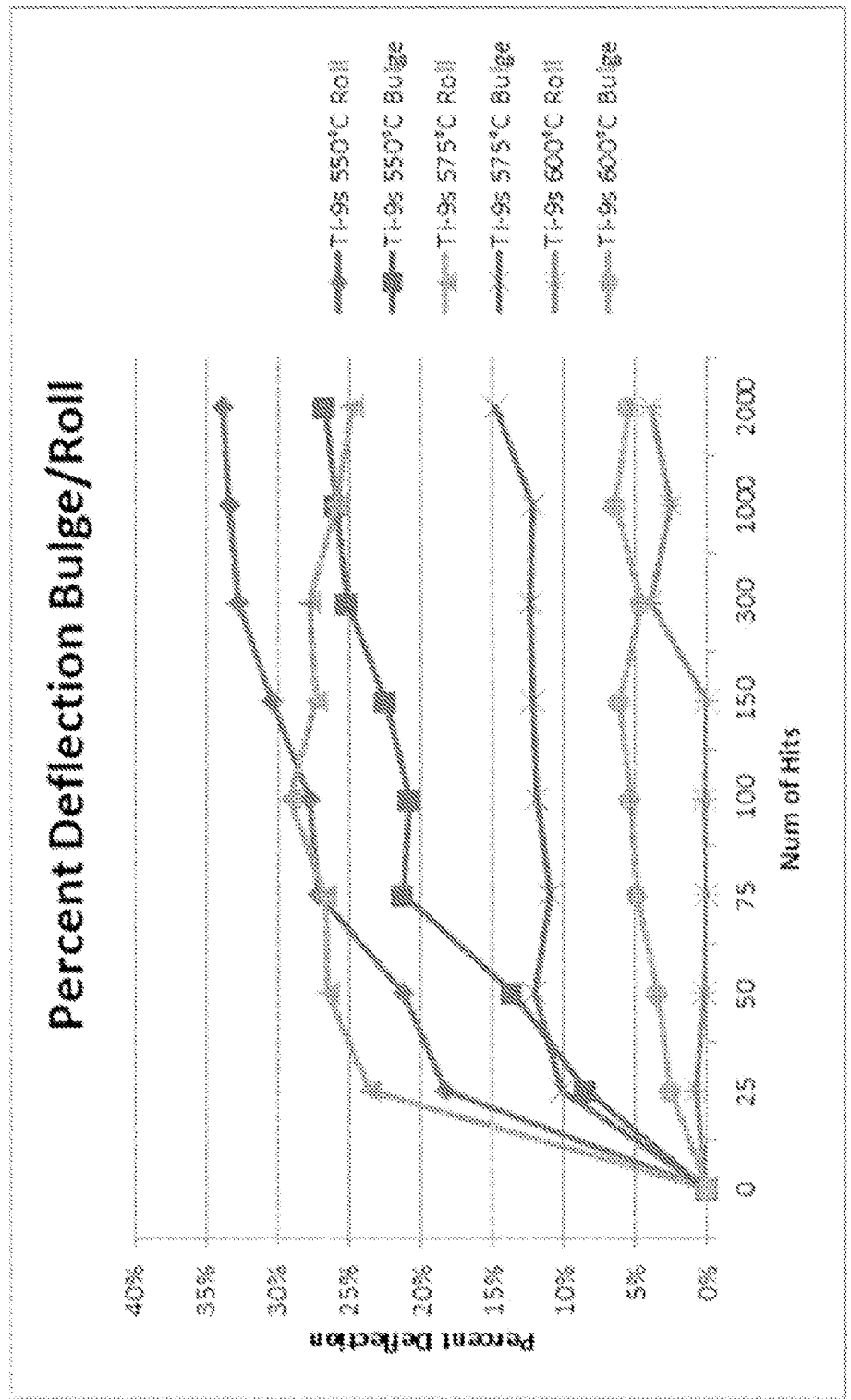
FIG. 9 is a chart showing experimental bulge and roll measurements for faceplates that are subjected to various heat-treatment processes.

Referring now to FIG. 9, an experiment was performed to compare the effect of various heat treatment temperatures on the faceplate 14 over the course of 2,000 hits or ball strikes. The faceplates 14 were formed from Ti-9S alloy. One club head assembly was heated to 550° C., which is below the solvus temperature of the Ti-9S alloy. A second club head assembly was heated to 575° C. and a third club head was heated to 600° C., which is above the solvus temperature of the Ti-9S alloy. The measurement data provided in FIG. 9 represent the percentage change in the radius of curvature of the bulge and the roll dimensions compared to the original radius curvature. As the faceplate becomes more flat, the radius of curvature increases. The club head assembly treated at 550° C. flattened significantly in both its roll and bulge dimensions within a few hits on a golf ball. In contrast, the club head assembly treated at 600° C. maintained its curvature significantly better than the club head assemblies after 2,000 hits.

In one embodiment, the faceplate 14 formed from Ti-9S and heat treated at 600° C. remains within 1% of its original roll curvature and within 3% of its original bulge curvature after 25 strikes. In one embodiment, the faceplate 14 formed from Ti-9S and heat treated at 575° C. remains within 24% of its original roll curvature and within 11% of its original bulge curvature after 25 strikes. In one embodiment, the faceplate 14 formed from Ti-9S and heat treated at 550° C. remains within 19% of its original roll curvature and within 9% of its original bulge curvature after 25 strikes.

In one embodiment, the faceplate 14 formed from Ti-9S and heat treated at 600° C. retains its original roll curvature and is within 4% of its original bulge curvature after 50 strikes. In one embodiment, the faceplate 14 formed from Ti-9S and heat treated at 575° C. remains within 28% of its original roll curvature and within 13% of its original bulge curvature after 50 strikes. In one embodiment, the faceplate 14 formed from Ti-9S and heat treated at 550° C. remains within 23% of its original roll curvature and within 15% of its original bulge curvature after 50 strikes.

In one embodiment, the faceplate 14 formed from Ti-9S and heat treated at 600° C. retains its original roll curvature and is within 5% of its original bulge curvature after 75 strikes. In one embodiment, the faceplate 14 formed from Ti-9S and heat treated at 575° C. remains within 28% of its original roll curvature and within 12% of its original bulge curvature after 75 strikes. In one embodiment, the faceplate 14 formed from Ti-9S and heat treated at 550° C. remains within 28% of its original roll curvature and within 23% of its original bulge curvature after 75 strikes.

In one embodiment, the faceplate 14 formed from Ti-9S and heat treated at 600° C. retains its original roll curvature and is within 6% of its original bulge curvature after 100 strikes. In one embodiment, the faceplate 14 formed from Ti-9S and heat treated at 575° C. remains within 30% of its original roll curvature and within 13% of its original bulge curvature after 100 strikes. In one embodiment, the faceplate 14 formed from Ti-9S and heat treated at 550° C. remains within 29% of its original roll curvature and within 22% of its original bulge curvature after 100 strikes.

In one embodiment, the faceplate 14 formed from Ti-9S and heat treated at 600° C. retains its original roll curvature and is within 7% of its original bulge curvature after 150 strikes. In one embodiment, the faceplate 14 formed from Ti-9S and heat treated at 575° C. remains within 28% of its original roll curvature and within 13% of its original bulge curvature after 150 strikes. In one embodiment, the faceplate 14 formed from Ti-9S and heat treated at 550° C. remains within 31% of its original roll curvature and within 24% of its original bulge curvature after 150 strikes.

In one embodiment, the faceplate 14 formed from Ti-9S and heat treated at 600° C. remains within 5% of its original roll curvature and within 5% of its original bulge curvature after 300 strikes. In one embodiment, the faceplate 14 formed from Ti-9S and heat treated at 575° C. remains within 28% of its original roll curvature and within 14% of its original bulge curvature after 300 strikes. In one embodiment, the faceplate 14 formed from Ti-9S and heat treated at 550° C. remains within 34% of its original roll curvature and within 26% of its original bulge curvature after 300 strikes.

In one embodiment, the faceplate 14 formed from Ti-9S and heat treated at 600° C. remains within 4% of its original roll curvature and within 7% of its original bulge curvature after 1,000 strikes. In one embodiment, the faceplate 14 formed from Ti-9S and heat treated at 575° C. remains within 27% of its original roll curvature and within 13% of its original bulge curvature after 1,000 strikes. In one embodiment, the faceplate 14 formed from Ti-9S and heat treated at 550° C. remains within 34% of its original roll curvature and within 27% of its original bulge curvature after 1,000 strikes.

In one embodiment, the faceplate 14 formed from Ti-9S and heat treated at 600° C. remains within 5% of its original roll curvature and within 6% of its original bulge curvature after 2,000 strikes. In one embodiment, the faceplate 14 formed from Ti-9S and heat treated at 575° C. remains within 25% of its original roll curvature and within 15% of its original bulge curvature after 2,000 strikes. In one embodiment, the faceplate 14 formed from Ti-9S and heat treated at 550° C. remains within 34% of its original roll curvature and within 28% of its original bulge curvature after 2,000 strikes.

Thus, the invention provides, among other things, a method of forming a golf club head assembly. Although the invention has been described in detail with reference to certain preferred embodiments, variations and modifications exist within the scope and spirit of one or more independent aspects of the invention as described.

The invention claimed is:

1. A method of forming a golf club head assembly, the method comprising:
   providing a faceplate formed from an α-β titanium alloy, the alloy having a solvus temperature;
   aligning the faceplate with a recess of a club head;
   welding the faceplate to the club head;
   after welding the faceplate, heating the club head and faceplate to a temperature that is greater than the solvus temperature of the faceplate for a predetermined amount of time; and
   after heating the club head and faceplate, allowing the club head and faceplate to air cool.

2. The method of claim 1, wherein welding the faceplate includes a pulse plasma welding process.

3. The method of claim 1, wherein heating the club head and faceplate includes heating the club head and faceplate for between 1 hour and 6 hours.

4. The method of claim 3, wherein heating the club head and faceplate includes heating the club head and faceplate to between 400° C. and 630° C.

5. The method of claim 1, wherein heating the club head and faceplate includes heating the club head and faceplate to between 475° C. and 625° C. for between 1 hour and 6 hours.

6. The method of claim 5, wherein heating the club head and faceplate includes heating the club head and faceplate to between 475° C. and 550° C. for between 4 hours and 6 hours.

7. The method of claim 6, wherein heating the club head and faceplate includes heating the club head and faceplate to between 475° C. and 500° C. for between 4 hours and 6 hours.

8. The method of claim 5, wherein heating the club head and faceplate includes heating the club head and faceplate to between 550° C. and 625° C. for between 1 hour and 2 hours.

9. The method of claim 8, wherein heating the club head and faceplate includes heating the club head and faceplate to between 575° C. and 625° C. for between 1 hour and 2 hours.

10. The method of claim 1, wherein the faceplate is formed from one of Ti 6-4 and Ti-9S.

* * * * *